United States Patent
Chen et al.

(10) Patent No.: US 10,635,965 B2
(45) Date of Patent: Apr. 28, 2020

(54) NEURAL NETWORK CONVOLUTION COMPUTATION METHOD AND DEVICE, AND COMPUTER-READABLE STORAGE MEDIUM

(71) Applicant: Shanghai Cambricon Information Technology Co., Ltd., Pudong New Area (CN)

(72) Inventors: Tianshi Chen, Pudong New Area (CN); Yimin Zhuang, Pudong New Area (CN); Qi Guo, Pudong New Area (CN); Shaoli Liu, Pudong New Area (CN); Yunji Chen, Pudong New Area (CN)

(73) Assignee: SHANGHAI CAMBRICON INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/440,204

(22) Filed: Jun. 13, 2019

(65) Prior Publication Data
US 2019/0311242 A1   Oct. 10, 2019

Related U.S. Application Data

(63) Continuation-in-part of application No. PCT/CN2017/116161, filed on Dec. 14, 2017.

(30) Foreign Application Priority Data

Dec. 14, 2016   (CN) .......................... 2016 1 1152537

(51) Int. Cl.
*G06N 3/08* (2006.01)
*G06N 5/02* (2006.01)
(Continued)

(52) U.S. Cl.
CPC ............... *G06N 3/02* (2013.01); *G06F 17/16* (2013.01); *G06N 3/04* (2013.01); *G06N 3/063* (2013.01)

(58) Field of Classification Search
CPC .................................. G06N 3/02; G06F 17/16
(Continued)

(56) References Cited

U.S. PATENT DOCUMENTS 9,646,243 B1 * 5/2017 Gokmen ............... G06N 3/0635
2003/0120363 A1 * 6/2003 Luo ........................ G06N 3/063
700/48

(Continued)

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.
(Continued)

*Primary Examiner* — Brandon S Cole
(74) *Attorney, Agent, or Firm* — Getech Law LLC; Jun Ye

(57) ABSTRACT

Aspects of a neural network convolution device are described herein. The aspects may include a matrix transformer and a matrix multiplication module. The matrix transformer may be configured to receive an input data matrix and a weight matrix, transform the input data matrix into a transformed input data matrix based on a first transformation matrix, and transform the weight matrix into a transformed weight matrix based on a second transformation matrix. The matrix multiplication module may be configured to multiply one or more input data elements in the transformed input data matrix with one or more weight elements in the transformed weight matrix to generate an intermediate output matrix. The matrix transformer may be further configured to transform the intermediate output matrix into an output matrix based on an inverse transformation matrix.

18 Claims, 3 Drawing Sheets

(51) Int. Cl.
*G06F 17/16* (2006.01)
*G10L 25/90* (2013.01)
*G06T 5/00* (2006.01)
*G06N 3/02* (2006.01)
*G06N 3/063* (2006.01)
*G06N 3/04* (2006.01)

(58) Field of Classification Search
USPC .................................................. 706/1–62; 1/1
See application file for complete search history.

(56) References Cited

U.S. PATENT DOCUMENTS

| | | | | |
|---|---|---|---|---|
| 2006/0085497 | A1* | 4/2006 | Sehitoglu | G06F 17/142 |
| | | | | 708/405 |
| 2009/0006103 | A1* | 1/2009 | Koishida | G10L 19/167 |
| | | | | 704/500 |
| 2009/0195535 | A1* | 8/2009 | Kanumuri | G06F 17/145 |
| | | | | 345/418 |
| 2010/0118981 | A1* | 5/2010 | Escoda | G06T 5/10 |
| | | | | 375/240.29 |
| 2013/0262096 | A1* | 10/2013 | Wilhelms-Tricarico | ............... |
| | | | | G10L 25/90 |
| | | | | 704/202 |
| 2017/0344876 | A1* | 11/2017 | Brothers | G06F 17/153 |

OTHER PUBLICATIONS

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X" an Accelerator for Sparse Neural Networks", The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

CN201111408882.5, Official Action dated Jan. 6, 2020, 12 Pages (No English translation).

Lavin et al., Fast Algorithms for Convolutional Neural Networks; arXiv:1509.09308v2; Nov. 10, 2015.

Courbariaux et al., Binarized Neural Networks: Training Neural Networks with Weights and Activations Constrained to + 1 or -1; arXiv:1602.02830v3; Mar. 17, 2016.

* cited by examiner

NEURAL NETWORK CONVOLUTION COMPUTATION METHOD AND DEVICE, AND COMPUTER-READABLE STORAGE MEDIUM

BACKGROUND

Multilayer artificial neural networks are widely involved in pattern recognition, image processing, function approximation, optimality computation, etc. In order to adapt to the increasingly high task requirements, the size and the complexity of the neural network are increasing. For example, a large convolution neural network may include hundreds of layers of operations. Particularly in convolution neural networks, large amount of convolution operations may reduce the processing speed of the neural network, which may further impair the practical applications of neural networks.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network convolution device. The example neural network convolution device may include a matrix transformer and a matrix multiplication module. The matrix transformer may be configured to receive an input data matrix and a weight matrix, transform the input data matrix into a transformed input data matrix based on a first transformation matrix, and transform the weight matrix into a transformed weight matrix based on a second transformation matrix. The matrix multiplication module may be configured to multiply one or more input data elements in the transformed input data matrix with one or more weight elements in the transformed weight matrix to generate an intermediate output matrix. The matrix transformer may be further configured to transform the intermediate output matrix into an output matrix based on an inverse transformation matrix.

Another example aspect of the present disclosure provides an example method for convolution in a neural network. The example method may include receiving, by a matrix transformer, an input data matrix and a weight matrix; transforming, by the matrix transformer, the input data matrix into a transformed input data matrix based on a first transformation matrix; transforming, by the matrix transformer, the weight matrix into a transformed weight matrix based on a second transformation matrix; multiplying, by a matrix multiplication module, one or more input data elements in the transformed input data matrix with one or more weight elements in the transformed weight matrix to generate an intermediate output matrix; and transforming, by the matrix transformer, the intermediate output matrix into an output matrix based on an inverse transformation matrix.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

In many examples of multilayer neural networks, convolution operations between input data and convolution kernels may be time consuming and lower the efficiency of the entire system. Typically, the input data and the convolution kernels may be formatted in matrices. However, the matrices, in most cases, are of different sizes. For example, the input data matrix may include eight columns and nine rows but the convolution kernel may include two columns and two rows. Thus, a conventional convolution process may include multiple matrix multiplication operations between the convolution kernel and different portions of the input data matrix.

In accordance with the present disclosure, a neural network convolution device may be configured to transform the input data matrix and the convolution kernel such that one matrix multiplication operation between the transformed matrices may be sufficient for the convolution process. As such, computational resources and time may be saved by eliminating a large amount of matrix multiplication operations.

Figure 1:
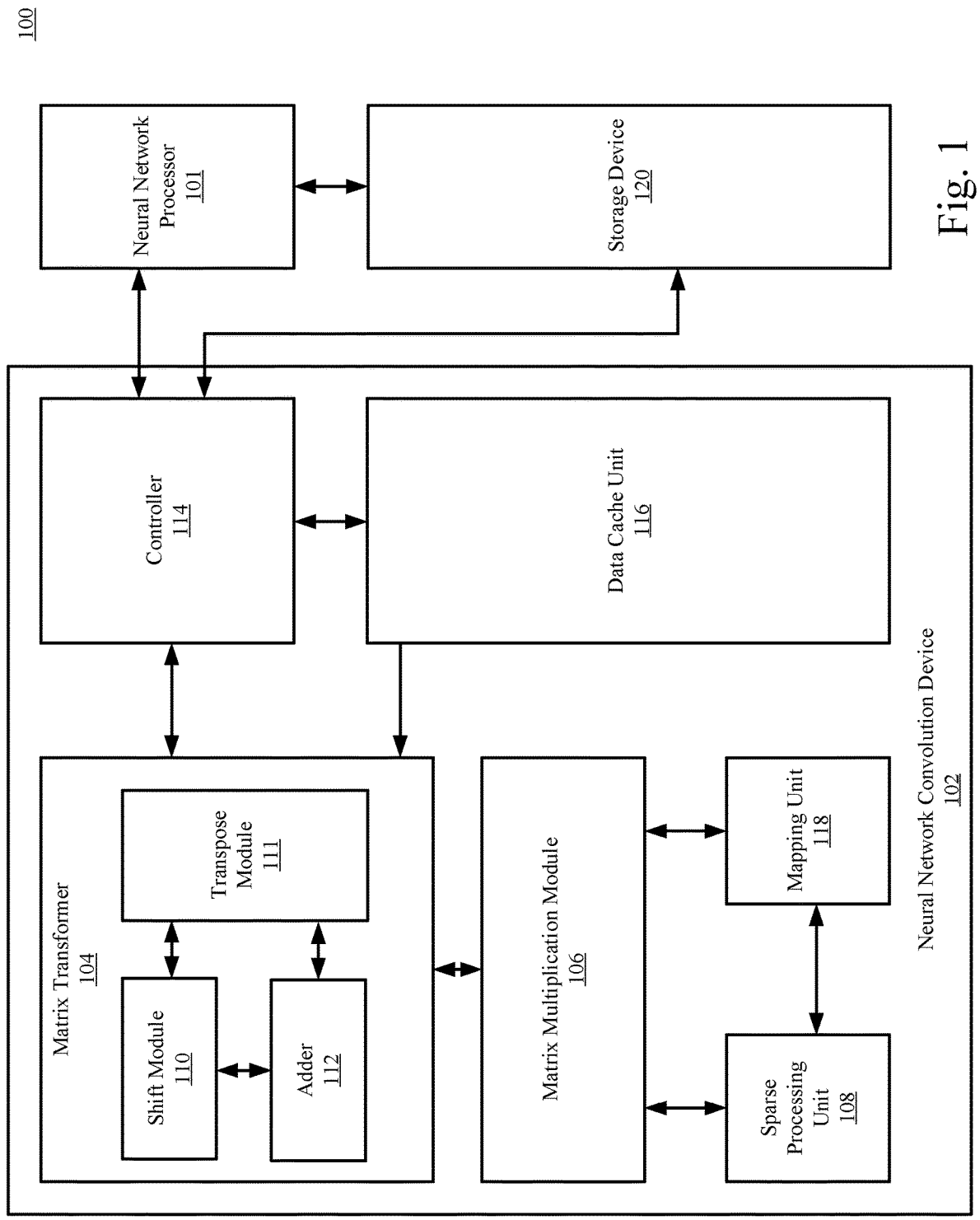
FIG. 1 illustrates a block diagram of an example neural network convolution system in accordance with the present disclosure.

FIG. 1 illustrates a block diagram of an example neural network convolution system 100 in accordance with the present disclosure. As depicted, the example neural network convolution system 100 may include a neural network convolution device 102 communicatively connected to a neural network processor 101 and a storage device 120. The neural network processor 101 may refer to a general-purpose processor or a processor specifically designated for performing operations related to neural networks.

The neural network processor 101 may instruct the neural network convolution device 102 to perform a convolution operation between input data and a convolution kernel by transmitting an instruction to a controller 114 of the neural network convolution device 102. The controller 114 may be configured to decode the instruction to retrieve addresses of the input data and the convolution kernel. According to the addresses, the controller 114 may be configured to access the storage device 120 to read the input data and the convolution kernel. In at least some examples, the input data may be stored in a form of matrix that may be referred to as an input data matrix hereinafter. The convolution kernel may be stored in a form of matrix that includes one or more weight values and may be referred to as a weight matrix hereinafter. The input data matrix and the weight matrix may be temporarily stored in a data cache unit 116 of the neural network convolution device 102.

Further, the controller 114 may be configured to retrieve a first transformation matrix C, a second transformation matrix G, and an inverse transformation matrix A from the data cache unit 116. In at least some examples, the first transformation matrix C, the second transformation matrix G, and the inverse transformation matrix A may be calculated based on the respective sizes of the input data matrix and the weight matrix together with a stride for moving the weight matrix. It is notable that the first transformation matrix C, the second transformation matrix G, and the inverse transformation matrix A may maintain the same values and sizes regardless of the values of the input data matrix and the weight matrix.

Although the predetermination of the first transformation matrix C, the second transformation matrix G, and the inverse transformation matrix A may be carried out by some devices external to the neural network convolution device 102 and stored in the data cache unit 116, the predetermination process is described here for purpose of clarity.

Predetermination of C, G, and A

In at least some examples, the first transformation matrix C, the second transformation matrix G, and the inverse transformation matrix A may be predetermined according to algorithms proposed by Shmuel Winograd ("Winograd algorithms" hereinafter). According to at least one of Winograd algorithms, given a first matrix and a second matrix in different sizes, the first transformation matrix C, the second transformation matrix G, and the inverse transformation matrix A may be determined regardless of the values in the first and the second matrix. Elements and sizes of the first transformation matrix C, the second transformation matrix G, and the inverse transformation matrix A are affected by the sizes of the first and the second matrix and the stride for moving the second matrix.

An example process of predetermining the first transformation matrix C, the second transformation matrix G, and the inverse transformation matrix A are described here. Other Winograd algorithms may also be implemented to determine the first transformation matrix C, the second transformation matrix G, and the inverse transformation matrix A. Other Winograd algorithms may at least include Andrew Lavin et al., "*Fast Algorithms for Convolutional Neural Networks*" (2015) and Liu, Xingyu, "*Pruning of Winograd and FFT Based Convolution Algorithm*" (2016).

For example, assuming the input data matrix is $[d_1, d_2, d_3]$ and the weight matrix is $[w_1, w_2]$ and the stride for moving the weight matrix is 1, the multiplication between the input data matrix and the weight matrix may be represented as $$\begin{bmatrix} d_1, d_2 \\ d_2, d_3 \end{bmatrix} \begin{bmatrix} w_1 \\ w_2 \end{bmatrix} = \begin{bmatrix} output_1 \\ output_2 \end{bmatrix}.$$

According to one of the Winograd algorithms, the following values may be determined:

$M_1=(-d_1+d_2+d_3)w_1$, $M_2=d_1w_1$, $M_3=d_2w_2$, $M_4=0$ $M_5=(d_2+d_3)(-w_1)$, $M_6=0$, $M_7=d_3(w_1-w_2)$ $output_1=M_2+M_3+M_6$, $output_2=M_1+M_2+M_4-M_7$ and may be further rewritten to delete the zero value items:

$m_1=(-d_1+d_2+d_3)w_1$, $m_2=d_1w_1$, $m_3=d_2w_2$, $m_4=d_3(w_1-w_2)$ $output_1=m_2+m_3$, $output_2=m_1+m_2-m_4$ and the first transformation matrix C, the second transformation matrix G, and the inverse transformation matrix A may be determined as follows:

$$C = \begin{bmatrix} -1 & 1 & 0 & 0 \\ 1 & 0 & 1 & 0 \\ 1 & 0 & 0 & 1 \end{bmatrix}, G = \begin{bmatrix} 1 & 0 \\ 1 & 0 \\ 0 & 1 \\ 1 & -1 \end{bmatrix}, A = \begin{bmatrix} 0 & 1 \\ 1 & 1 \\ 1 & 0 \\ 0 & -1 \end{bmatrix}.$$

Thus, as long as the sizes of the input data matrix and the weight matrix, together with the stride for moving the weight matrix, are determined, the first transformation matrix C, the second transformation matrix G, and the inverse transformation matrix A may be predetermined before the process described in the present disclosure.

In some examples, the first transformation matrix C, the second transformation matrix G, and the inverse transformation matrix A may be transmitted to a matrix transformer 104 together with the input data matrix and the weight matrix by the controller 114. The matrix transformer 104 may be configured to transform the input data matrix in accordance with the following equation:

$d=C^T d_0 C$ in which C may refer to the first transformation matrix, $C^T$ may refer to a transpose matrix of the first transformation matrix, $d_0$ may refer to the input data matrix, and d may refer to a transformed input data matrix. The transpose matrix of the first transformation matrix may be determined by a transpose module 111 by switching the row and column indices of the first transformation matrix.

Similarly, the matrix transformer 104 may be configured to transform the weight matrix in accordance with the following equation:

$w=Gw_0G^T$ in which G may refer to the second transformation matrix, $G^T$ may refer to a transpose matrix of the second transformation matrix, $w_0$ may refer to the weight matrix, and w may refer to a transformed weight matrix. The transpose matrix of the second transformation matrix may be determined by the transpose module 111 by switching the row and column indices of the second transformation matrix.

In more detail, the matrix transformer 104 may include a shift module 110 and an adder 112. The shift module 110, in general, may be configured to perform bitwise shifting operations to a set of bits. Since the elements in the transformed input data matrix and the transformed weight matrix are binary, the shifting module 110 may be configured to perform multiplication operations to the elements by shifting the bits left or right. Compared to multiplication operations between two values, performing shifting operations may also save computational resources and time. Thus, the shift module 110 in collaboration with the adder 112 may be configured to perform multiplication and addition operations for the matrix multiplication operations described in the above equations.

Further, the transformed input data matrix and the transformed weight matrix may be transmitted to a matrix multiplication module 106. The matrix multiplication module 106 may be configured to multiply the transformed input data matrix with the transformed weight matrix in accordance with the following example equation:

$$t = w \odot d$$

in which w may refer to the transformed weight matrix, d may refer to the transformed input data matrix, and t may refer to an intermediate output matrix.

Notably, the elements in the transformed input data matrix and the transformed weight matrix, in many cases, may be zero for multilayer neural networks. Thus, the multiplication operation between a zero value and another value may be omitted to save computational resources and time. In some examples, a sparse processing unit 108 may be configured to generate a sparse sequence based on the transformed weight matrix. In the sparse sequence, zeroes may correspond to zero elements in the transformed weight matrix and ones may corresponds to non-zero elements in the transformed weight matrix. A mapping unit 118 may be configured to generate a correspondence table that maps values in the sparse sequence to elements in the transformed input data matrix. For example, The $K^{th}$ value of the sparse sequence may corresponded to the element in the $i^{th}$ row and $j^{th}$ column of the transformed input data matrix with M rows and N columns, satisfying $(i-1) \times N + j = K$ or $(j-1) \times M + i = K$. The following correspondence table is provided as an example.

TABLE 1

| | Elements in the transformed input data matrix | | | | | |
|---|---|---|---|---|---|---|
| | Row 1; Column 1 | Row 1; Column 2 | Row 2; Column 1 | Row 2; Column 2 | Row 3; Column 1 | Row 3; Column 2 |
| Values in the sparse sequence | $1^{st}$ value | $2^{nd}$ value | $3^{rd}$ value | $4^{th}$ value | $5^{th}$ value | $6^{th}$ value |

Based on the sparse sequence and the correspondence table, the matrix multiplication module 106 may be configured to selectively retrieve elements from the transformed input data matrix for the matrix multiplication operation. For example, the matrix multiplication module 106 may be configured to only retrieve the elements from the transformed input data matrix that correspond to the non-zero values in the sparse sequence.

In an example where the transformed input data matrix and the transformed weight matrix may be represented as follows:

$$d = \begin{bmatrix} 0 & 0 & 0 & 0 \\ -1 & 3 & 1 & -1 \\ 1 & -1 & 1 & -1 \\ 0 & 1 & -1 & 1 \end{bmatrix} \text{ and } w = \begin{bmatrix} 1 & 0.5 & 0.5 & 0 \\ 1.5 & 1.25 & 0.25 & 0 \\ 0.5 & 0.25 & 0.25 & 0 \\ 1 & 1 & 0 & 0 \end{bmatrix},$$

a sparse sequence may be generated as 1110111011101100. Based on the sparse sequence and a correspondence table, the matrix multiplication module 106 may omit elements in the transformed input data matrix, e.g., $[d_{03}, d_{13}, d_{23}, d_{32}, d_{33}]$. By omitting the elements that correspond to the zeroes in the sparse sequence, further computational resources may be saved.

Further, the intermediate output matrix may be transmitted to the matrix transformer 104. The matrix transformer 104 may be configured to transform the intermediate output matrix based on the inverse transformation matrix to generate an output matrix for the convolution, e.g., according to the following equation.

$$o = A^T t A$$

in which t may refer to the intermediate output matrix, A may refer to the inverse transformation matrix, $A^T$ may refer to a transpose matrix of the inverse transformation matrix, and o may refer to the output matrix. The output matrix may be transmitted back to the neural network processor 101 as a result of the convolution.

Figure 2:
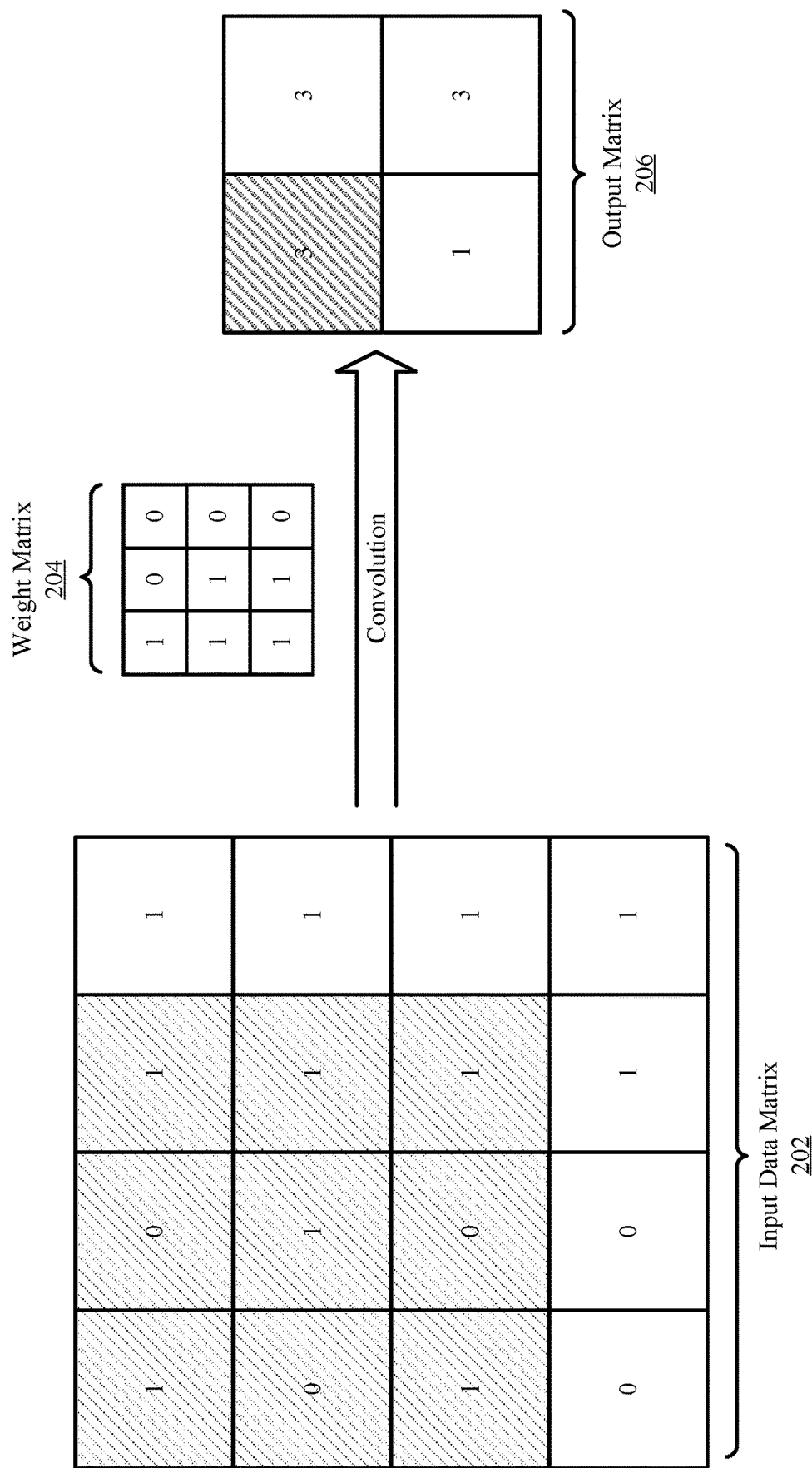
FIG. 2 illustrates an example convolution process that may be performed by the example neural network convolution system.

FIG. 2 illustrates an example convolution process that may be performed by the example neural network convolution system. As depicted, the example convolution process may include convoluting an input data matrix 202 with a weight matrix 204 to generate an output matrix 206. In some examples, the input data matrix 202 may be represented as $$d_0 = \begin{bmatrix} 1 & 0 & 1 & 1 \\ 0 & 1 & 1 & 1 \\ 1 & 0 & 1 & 1 \\ 0 & 0 & 1 & 1 \end{bmatrix},$$

and the weight matrix 204 may be represented as $$w_0 = \begin{bmatrix} 1 & 0 & 0 \\ 1 & 1 & 0 \\ 1 & 1 & 0 \end{bmatrix}.$$

Conventionally, since the sizes of the input data matrix 202 and the weight matrix 204 may be different, the convolution process include multiple matrix multiplication operations. For example, the weight matrix 204 may be multiplied with the top left portion of the input data matrix 202 to generate a first element (e.g., 3) of the output matrix 206.

In accordance with the present disclosure, the matrix transformer 104 may be configured to respectively transform the input data matrix 202 and the weight matrix 204. For example, the transformed input data matrix and the transformed weight matrix may be calculated as follows respectively:

$$d = C^T d_0 C = \begin{bmatrix} 0 & 0 & 0 & 0 \\ -1 & 3 & 1 & -1 \\ 1 & -1 & 1 & -1 \\ 0 & 1 & -1 & 1 \end{bmatrix}$$

$$w = G w_0 G^T = \begin{bmatrix} 1 & 0.5 & 0.5 & 0 \\ 1.5 & 1.25 & 0.25 & 0 \\ 0.5 & 0.25 & 0.25 & 0 \\ 1 & 1 & 0 & 0 \end{bmatrix}$$

in which C may refer to the first transformation matrix, $C^T$ may refer to a transpose matrix of the first transformation matrix, $d_0$ may refer to the input data matrix 202, d may refer to the transformed input data matrix, G may refer to the second transformation matrix, $G^T$ may refer to a transpose matrix of the second transformation matrix, $w_0$ may refer to the weight matrix 204, and w may refer to the transformed weight matrix. As shown, the transformed input data matrix and the transformed weight matrix are both 4 by 4 and thus one matrix multiplication operation may be sufficient.

Based on the transformed weight matrix, the sparse processing unit 108 may be configured to generate a sparse sequence, e.g., 1110111011101100. Each value in the sparse sequence may correspond to an element in the transformed input data matrix according to a correspondence table generated by the mapping unit 118. The matrix multiplication module 106 may be configured to select elements in the transformed input data matrix that correspond to the non-zero values in the sparse sequence. For example, the matrix multiplication module 106 may be configured to select elements other than $[d_{03}, d_{13}, d_{23}, d_{32}, d_{33}]$ for the matrix multiplication. The intermediate output matrix may be represented as follows:

$$t = w \odot d = \begin{bmatrix} 0 & 0 & 0 & 0 \\ -1.5 & 3.75 & 0.25 & 0 \\ 0.5 & -0.25 & 0.25 & 0 \\ 0 & 1 & 0 & 0 \end{bmatrix}$$

in which w may refer to the transformed weight matrix, d may refer to the transformed input data matrix, and t may refer to an intermediate output matrix.

Further, the matrix transformer 104 may be configured to transform the intermediate output matrix based on the inverse transformation matrix to generate the output matrix 206. For example, the output matrix may be represented as follows:

$$o = A^T t A = \begin{bmatrix} 3 & 3 \\ 1 & 3 \end{bmatrix}$$

in which t may refer to the intermediate output matrix, A may refer to the inverse transformation matrix, $A^T$ may refer to a transpose matrix of the inverse transformation matrix, and o may refer to the output matrix 206.

Figure 3:
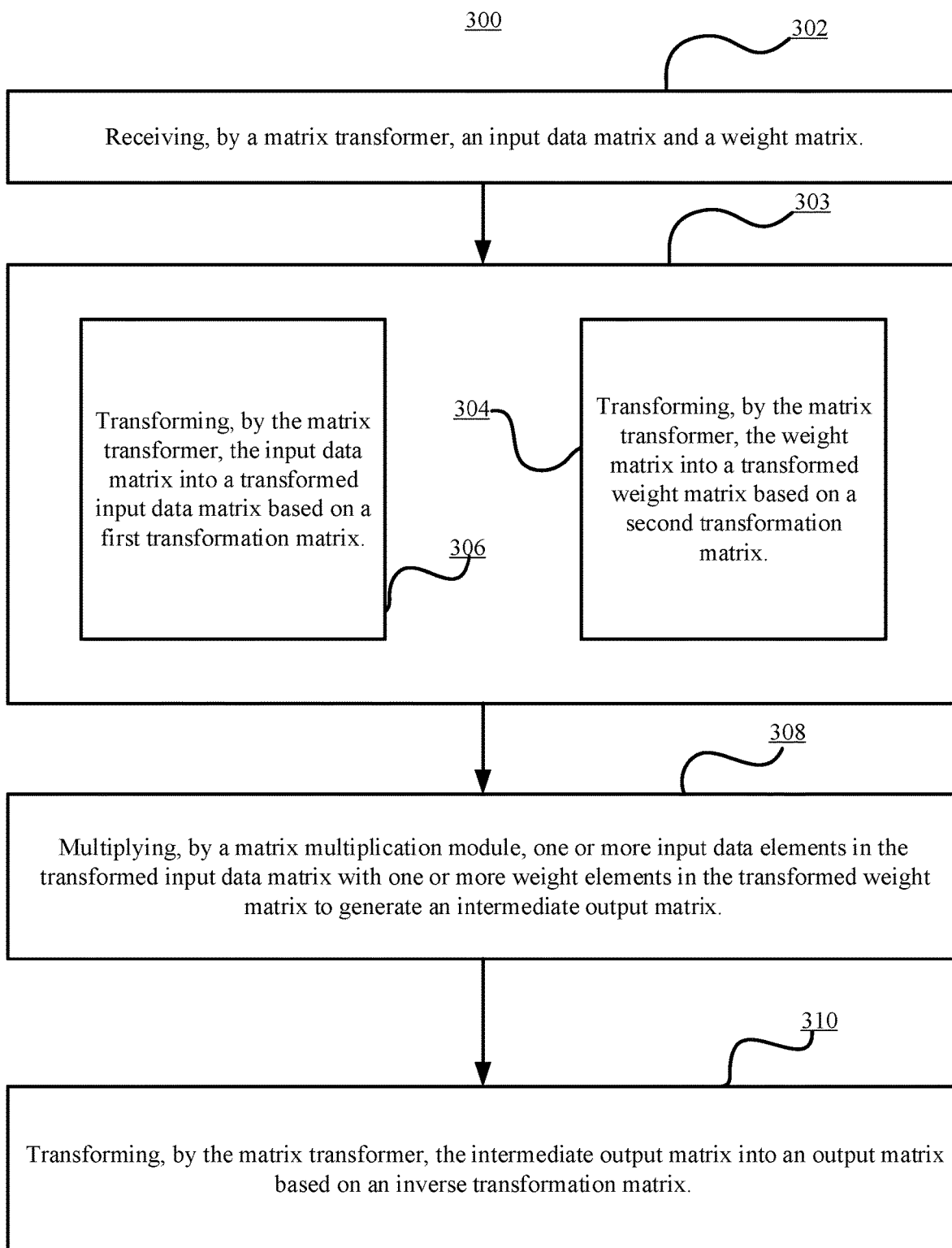
FIG. 3 illustrates a flow chart of an example method which the example neural network convolution system may perform.

FIG. 3 illustrates a flow chart of an example method in which the example neural network convolution system may be implemented. The example process 300 may be performed by one or more components described in accordance with FIG. 1.

At block 302, the example process 300 may include receiving, by a matrix transformer, an input data matrix and a weight matrix. For example, the matrix transformer 104 may be configured to receive the input data matrix 202 and the weight matrix 204. In the example illustrated in FIG. 2, the input data matrix 202 may be represented as $$d_0 = \begin{bmatrix} 1 & 0 & 1 & 1 \\ 0 & 1 & 1 & 1 \\ 1 & 0 & 1 & 1 \\ 0 & 0 & 1 & 1 \end{bmatrix},$$

and the weight matrix 204 may be represented as $$w_0 = \begin{bmatrix} 1 & 0 & 0 \\ 1 & 1 & 0 \\ 1 & 1 & 0 \end{bmatrix}.$$

The example process 300 may continue to block 303 that includes block 304 and block 306. The operations indicated by block 304 and block 306 may be performed parallelly or sequentially.

At block 304, the example process 300 may include transforming, by the matrix transformer, the input data matrix into a transformed input data matrix based on a first transformation matrix. For example, the matrix transformer 104 may be configured to transform the input data matrix 202 based on the first transformation matrix C. For example, the transformed input data matrix may be represented as:

$$d = C^T d_0 C = \begin{bmatrix} 0 & 0 & 0 & 0 \\ -1 & 3 & 1 & -1 \\ 1 & -1 & 1 & -1 \\ 0 & 1 & -1 & 1 \end{bmatrix},$$

in which C may refer to the first transformation matrix, $C^T$ may refer to a transpose matrix of the first transformation matrix, $d_0$ may refer to the input data matrix 202, d may refer to the transformed input data matrix.

At block 306, the example process 300 may include transforming, by the matrix transformer, the weight matrix into a transformed weight matrix based on a second transformation matrix. For example, the matrix transformer 104 may be configured to transform the weight matrix 204 based on the second transformation matrix G. For example, the transformed weight matrix may be represented as:

$$w = G w_0 G^T = \begin{bmatrix} 1 & 0.5 & 0.5 & 0 \\ 1.5 & 1.25 & 0.25 & 0 \\ 0.5 & 0.25 & 0.25 & 0 \\ 1 & 1 & 0 & 0 \end{bmatrix},$$

in which G may refer to the second transformation matrix, $G^T$ may refer to a transpose matrix of the second transformation matrix, $w_0$ may refer to the weight matrix 204, and w may refer to the transformed weight matrix.

At block 308, the example process 300 may include multiplying, by a matrix multiplication module, one or more input data elements in the transformed input data matrix with one or more weight elements in the transformed weight matrix to generate an intermediate output matrix. For example, the matrix multiplication module 106 may be configured to multiply elements in the transformed input data matrix with elements in the transformed weight matrix.

In more detail, based on the transformed weight matrix, the sparse processing unit 108 may be configured to generate a sparse sequence, e.g., 1110111011101100. Each value in the sparse sequence may correspond to an element in the transformed input data matrix according to a correspondence table generated by the mapping unit 118. The matrix multiplication module 106 may be configured to select elements in the transformed input data matrix that correspond to the non-zero values in the sparse sequence. For example, the matrix multiplication module 106 may be configured to select elements other than $[d_{03}, d_{13}, d_{23}, d_{32}, d_{33}]$ for the matrix multiplication. The intermediate output matrix may be represented as follows:

$$t = w \odot d = \begin{bmatrix} 0 & 0 & 0 & 0 \\ -1.5 & 3.75 & 0.25 & 0 \\ 0.5 & -0.25 & 0.25 & 0 \\ 0 & 1 & 0 & 0 \end{bmatrix}$$

in which w may refer to the transformed weight matrix, d may refer to the transformed input data matrix, and t may refer to an intermediate output matrix.

At block 310, the example process 300 may include transforming, by the matrix transformer, the intermediate output matrix into an output matrix based on an inverse transformation matrix. For example, the matrix transformer 104 may be configured to transform the intermediate output matrix into the output matrix based on the inverse transformation matrix. For example, the output matrix may be represented as follows:

$$o = A^T t A = \begin{bmatrix} 3 & 3 \\ 1 & 3 \end{bmatrix}$$

in which t may refer to the intermediate output matrix, A may refer to the inverse transformation matrix, $A^T$ may refer to a transpose matrix of the inverse transformation matrix, and o may refer to the output matrix 206.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A neural network convolution device, comprising:
   a matrix transformer configured to
      receive an input data matrix and a weight matrix,
      transform the input data matrix into a transformed input data matrix based on a first transformation matrix, and
      transform the weight matrix into a transformed weight matrix based on a second transformation matrix; and
   a matrix multiplication module configured to multiply one or more input data elements in the transformed input data matrix with one or more weight elements in the transformed weight matrix to generate an intermediate output matrix, wherein the matrix transformer is further configured to transform the intermediate output matrix into an output matrix based on an inverse transformation matrix,
   wherein the first transformation matrix, the second transformation matrix, and the inverse transformation matrix are predetermined based on a first size of the input data matrix, a second size of the weight matrix, and a stride for moving a convolution kernel before the matrix transformer receives the input data matrix.

2. The neural network convolution device of claim 1, further comprising a sparse processing unit configured to generate a sparse sequence based on the weight elements in the transformed weight matrix.

3. The neural network convolution device of claim 2, further comprising a mapping unit configured to generate a correspondence table that maps the sparse sequence to the transformed input data matrix.

4. The neural network convolution device of claim 3, wherein the matrix multiplication module is further configured to select the one or more input data elements based on the correspondence table prior to the multiplication.

5. The neural network convolution device of claim 2, wherein the sparse processing unit is further configured to set elements in the sparse sequence that correspond to zero values in the transformed weight matrix to zero.

6. The neural network convolution device of claim 1, wherein the matrix transformer is further configured to sequentially multiply a transpose matrix of the first transformation matrix, the input data matrix, and the first transformation matrix to generate the transformed input data matrix.

7. The neural network convolution device of claim 1, wherein the matrix transformer is further configured to sequentially multiply the second transformation matrix, the weight matrix, and a transpose matrix of the second transformation matrix to generate the transformed weight matrix.

8. The neural network convolution device of claim 1, wherein the matrix transformer includes a shift module and an adder configured to collaboratively transform the input data matrix and the weight matrix.

9. The neural network convolution device of claim 1, further comprising a controller configured to:
   receive an instruction to convolute the input data matrix with the weight matrix, and
   decode the instruction into one or more micro-instructions that include addresses for retrieving the input data matrix and the weight matrix.

10. A method for convolution in a neural network, comprising:
    predetermining a first transformation matrix, a second transformation matrix, and an inverse transformation matrix based on a first size of an input data matrix, a second size of a weight matrix, and a stride for moving a convolution kernel;
    receiving, by a matrix transformer, the input data matrix and the weight matrix subsequent to the predetermining of the first transformation matrix, the second transformation matrix, and the inverse transformation matrix;
    transforming, by the matrix transformer, the input data matrix into a transformed input data matrix based on a first transformation matrix;
    transforming, by the matrix transformer, the weight matrix into a transformed weight matrix based on a second transformation matrix;
    multiplying, by a matrix multiplication module, one or more input data elements in the transformed input data matrix with one or more weight elements in the transformed weight matrix to generate an intermediate output matrix; and
    transforming, by the matrix transformer, the intermediate output matrix into an output matrix based on an inverse transformation matrix.

11. The method of claim 10, further comprising generating, by a sparse processing unit, a sparse sequence based on the weight elements in the transformed weight matrix.

12. The method of claim 11, further comprising generating, by a mapping unit, a correspondence table that maps the sparse sequence to the transformed input data matrix.

13. The method of claim 12, further comprising selecting, by the matrix multiplication module, the one or more input data elements based on the correspondence table prior to the multiplication.

14. The method of claim 11, further comprising setting, by the sparse processing unit, elements in the sparse sequence that correspond to zero values in the transformed weight matrix to zero.

15. The method of claim 10, further comprising sequentially multiplying, by the matrix transformer, a transpose matrix of the first transformation matrix, the input data matrix, and the first transformation matrix to generate the transformed input data matrix.

16. The method of claim 10, further comprising sequentially multiplying, by the matrix transformer, the second transformation matrix, the weight matrix, and a transpose matrix of the second transformation matrix to generate the transformed weight matrix.

17. The method of claim 10, further comprising collaboratively transforming, by a shift module and an adder in the matrix transformer, the input data matrix and the weight matrix.

18. The method of claim 10, further comprising:
    receiving, by a controller, an instruction to convolute the input data matrix with the weight matrix; and
    decoding, by the controller, the instruction into one or more micro-instructions that include addresses for retrieving the input data matrix and the weight matrix.

* * * * *